US005235553A

United States Patent [19]

Garlick et al.

[11] Patent Number: 5,235,553

[45] Date of Patent: Aug. 10, 1993

[54] SOLID ULTRASONIC LENS

[75] Inventors: George F. Garlick; Victor I. Neeley, both of Kennewick, Wash.

[73] Assignee: Advanced Imaging Systems, Richland, Wash.

[21] Appl. No.: 796,464

[22] Filed: Nov. 22, 1991

[51] Int. Cl.[5] ..... G03B 42/06

[52] U.S. Cl. ..... 367/7; 367/150; 73/642; 128/663.01

[58] Field of Search ..... 367/7, 8, 150; 181/176; 128/663.01; 73/603, 642

[56] References Cited

U.S. PATENT DOCUMENTS

| | | | |
|---|---|---|---|
| Re. 32,062 | 1/1986 | Samodovitz | 367/150 |
| 3,687,219 | 8/1972 | Langlois . | |
| 3,802,533 | 4/1974 | Brenden . | |
| 3,898,608 | 8/1975 | Jones et al. | 367/7 |

*Primary Examiner*—Daniel T. Pihulic
*Attorney, Agent, or Firm*—Wells, St. John, Roberts, Gregory & Matkin

[57] ABSTRACT

A preferred embodiment of a large diameter solid ultrasonic imaging transducer is illustrated in FIG. 5 with alternate embodiments illustrated in FIGS. 6–9. The large diameter solid ultrasonic imaging lens 100 has a diameter preferably greater than six inches with a focal length-to-diameter ratio of between 1 and 2. The lens 100 has concave surfaces 108 and 110, and is composed of a homogenous material that has an ultrasonic impedance of less than twice that of water and has a density less than the water. Preferably, the velocity of the ultrasonic sound through homogenous plastic material is less than twice that of water. One or both of the concave surfaces 108 and 110 have surfaces that are without a constant radius and curvature, but however are composed of separate radius of curvatures for each small increment of lens surface to properly focus the ultrasound at a desired focal length "L".

An alternate embodiment is illustrated in FIG. 6 which has two exterior solid rigid lens elements that are of a concaval-convex nature forming a liquid lens 126 therebetween that has a double convex arrangement for accurately focusing the ultrasound rays to the desired focal length. Preferably, the solid lens surfaces are coated with a one-quarter wave length reflection reduction layer for reducing even further any ultrasonic reflection or energy loss.

30 Claims, 6 Drawing Sheets

SOLID ULTRASONIC LENS

TECHNICAL FIELD

This invention is directed to the field of ultrasonic lenses and more particularly to large diameter solid ultrasonic imaging lens used in a liquid ultrasonic coupling medium for ultrasonic holographic imaging.

BACKGROUND OF THE INVENTION

Although commercial application of ultrasonic holography as been accurately pursued by many persons in the scientific and industrial communities for many years, only limited results have been obtained even though it was once thought that ultrasonic holography held great promise. It was felt that the application of ultrasonic holography was particularly applicable to the fields of nondestructive testing of materials and medical diagnostics of soft tissues that are relatively transparent to ultrasonic radiation. One of the principal problems that has been encountered and not effectively resolved is the difficulty of obtaining quality and consistent images.

Solutions to this problem have been elusive, in part because of the difficulty in identifying the many causes that contribute to the problem. It is believed that one of the major problems has been the difficulty in devising or constructing quality large field ultrasonic imaging lenses. It appears that prior large field ultrasonic lenses exhibit substantial wave distortions and aberrations when used in a typical ultrasonic holographic imaging system such as illustrated in FIG. 1.

FIG. 1 shows a typical "real time" ultrasonic holographic imaging system generally designated with the numeral 10. The system 10 is intended to ultrasonically inspect the interior of an object 12 such as the soft tissue of a human limb. The ultrasonic holographic imaging system 10 generally has a hologram generating subsystem 14 for generating an ultrasonic hologram. The system 10 also includes a hologram viewing subsystem (optical-subsystem) 16 for optically viewing the interior of the object 12 from a first order refraction from the formed ultrasonic hologram.

The subsystem 14 includes an object ultrasonic transducer 18 for generating plane waves through a coupling medium 20 contained in a deformable membrane 22. The deformable membrane 22 intimately contacts the object 12 on one side and a deformable membrane 24 contacts the object on the other side to provide ultrasonic coupling with minimum energy loss or wave distortion. The deformable membrane 24 forms part of the side wall of a container 28 that contains a liquid coupling medium 30.

One of the principal components and the main subject of this invention is the provision of an ultrasonic imaging lens system 32 for viewing a large field and focusing at a desired object focal plane 34. The ultrasonic imaging lens system 32 focuses the ultrasonic energy onto a hologram detector surface 36. The ultrasonic imaging lens system 32 includes a large diameter object lens 38 that is moveable with respect to a large diameter lens 40 for adjusting the desired focal plane 34 in the object 12. The ultrasonic imaging lens system 32 includes a mirror 41 for reflecting the ultrasonic energy approximately 90° and onto the hologram detection surface 36 to form the hologram.

A ultrasonic reference transducer 42 directs coherent ultrasonic plane waves through the liquid medium 30 at an off-axis angle to the hologram detector surface 36 to form the hologram. Preferably, the hologram detection surface 36 is the liquid/gas interface surface that is supported in an isolated dish or mini-tank 44.

The hologram viewing subsystem 16 includes an optical lens 45 to achieve an effective point source of a coherent light beam from a laser (not shown). The focused coherent light is reflect from a mirror 46 through a collimating optical lens 47 and then onto the hologram detector surface 36 to illuminate the hologram and generate diffracted optical images. The diffracted coherent light radiation containing holographic information is directed back through the collimating lens 47 and separated into precisely defined diffracted orders in the focal plane of the collimating lens 47. A filter 48 is used to block all but a first diffraction order from an ocular viewing lens 49 to enable a human eye, a photographic film or a video camera to record in "real time" the object at the object focal plane. As previously mentioned, although such a system is operable, it has been difficult to obtain quality and consistent images.

Two prior art large field ultrasonic lenses are described in U.S. Pat. No. 3,802,533 entitled "Improvements In and Relating To Ultrasonic Lenses" granted to Byron B. Brenden. More specifically, FIG. 2 of this application shows an ultrasonic liquid lens generally designated with the numeral 50 having flexible membrane films 52 surrounding a liquid lens 54. The liquid lens 54 includes convex liquid lens surfaces 56 and 58 forming a double convex liquid lens. Each of the flexible membrane films 52 is preferably formed of a stretched polymeric film in which each of the films has a thickness of less than one-quarter of the wave length of the ultrasonic wave length emitted from the transducer. The liquid lens preferably contains a liquid that is composed of trichloro-trifluoro-ethane (Freon 113). Other useful liquid lens materials included carbon tetrachloride, chloroform, ethyl bromide, ethyl iodide, methyl bromide, and methyl iodide.

A second prior art liquid lens is illustrated in FIG. 3 and identified with the numeral 62. The lens 62 has exterior membrane films 64 and interior membrane films 66. The interior membrane films 66 forms a main liquid lens 68 in an inner chamber. The main liquid lens 68 includes convex liquid lens surfaces 70 and 72 forming a double convex lens. The exterior membrane films 64 forms outer chambers that are filled with liquid lens material forming a convex outer liquid surface 74 and an inner concave liquid surface 76. It is indicated that the main liquid lens contains substantially the same liquid material as lens 54. It is indicated that the outer lens elements having surfaces 74 and 76 would be either water or a denser liquid having a different transmission velocity than water.

It is stated in U.S. Pat. No. 3,802,533 that one of the advantages of ultrasonic liquid lenses over solid ultrasonic lenses is the ability for imaging the ultrasonic wave front of one plane onto another plane through the liquid medium without significant energy loss or aberrations. Although such lenses may have been an improvement over what had previously been devised, it has been recognized that such lenses are not entirely satisfactory, and are difficult to provide with constant focal lengths during extended use. Additionally, such lenses were relatively difficult to manufacture and maintain. Furthermore, such lenses appear to have significant spherical aberrations.

FIG. 4 illustrates a general prior art lens 80 having spherical surfaces for directing outer rays 82 and inner rays 84 converging to a central axis. The outer rays 82 converge at a first focal plane 86, whereas the inner rays 84 converge at a focal plane 88. In an ideal lens, the rays 82 and 84 would converge at the same focal plane. The distance "A" between the focal planes 86 and 88 indicates the degree of spherical aberrations in the lens 80.

One of the principal objects and advantages of this invention is provide an improved solid ultrasonic imaging lens that overcomes many of the disadvantages of the previous lens systems to provide images of high quality.

These and other objects and advantages of this invention will become apparent upon reading the following detailed description of a preferred embodiment.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
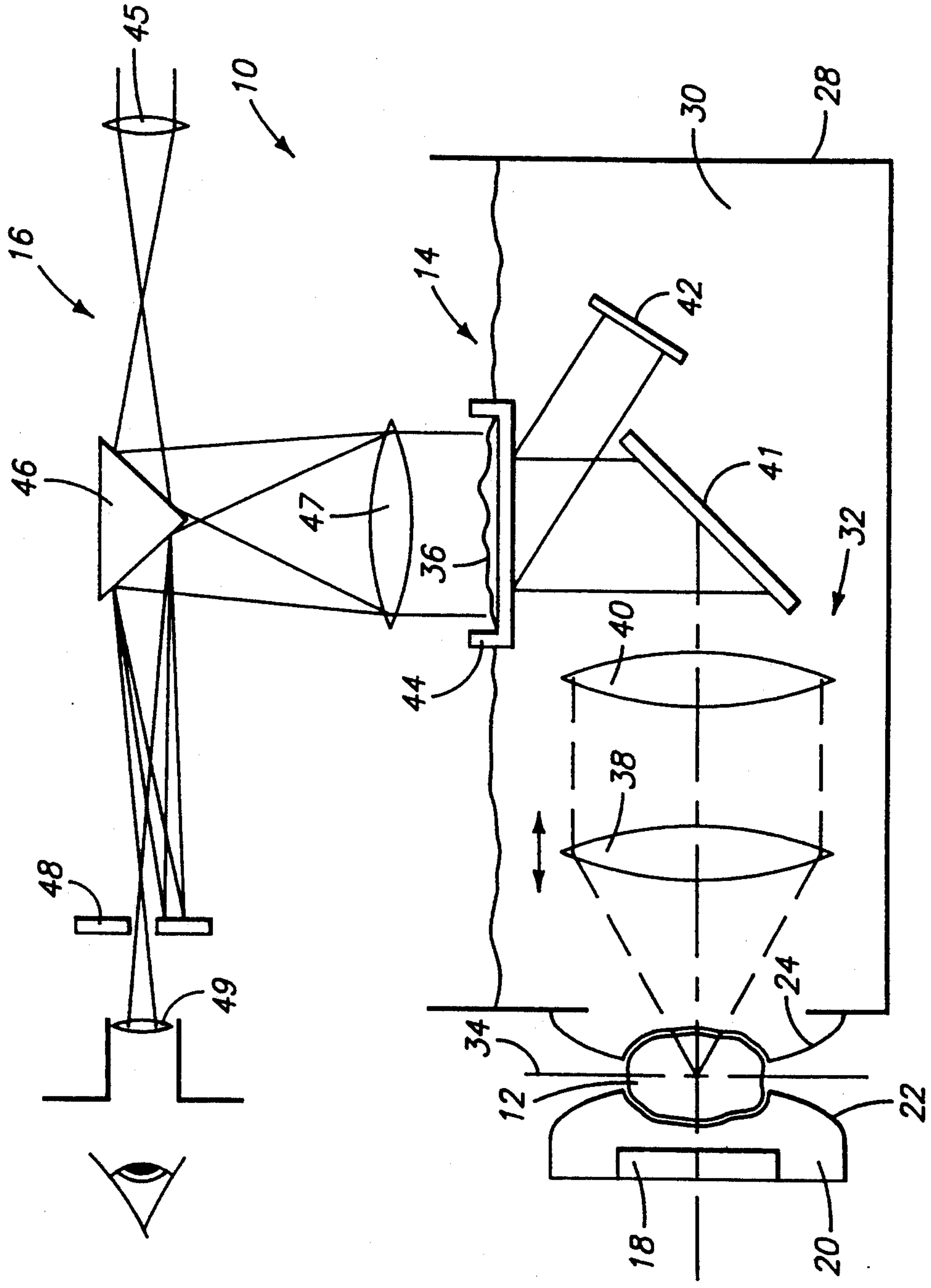
FIG. 1 PRIOR ART
FIG. 1 is a schematic view of a prior art ultrasonic holographic system illustrating the use of ultrasonic lens in an ultrasonic fluid transmitting medium for imaging ultrasonic holographic information to form a focused ultrasonic hologram.
Figure 3:
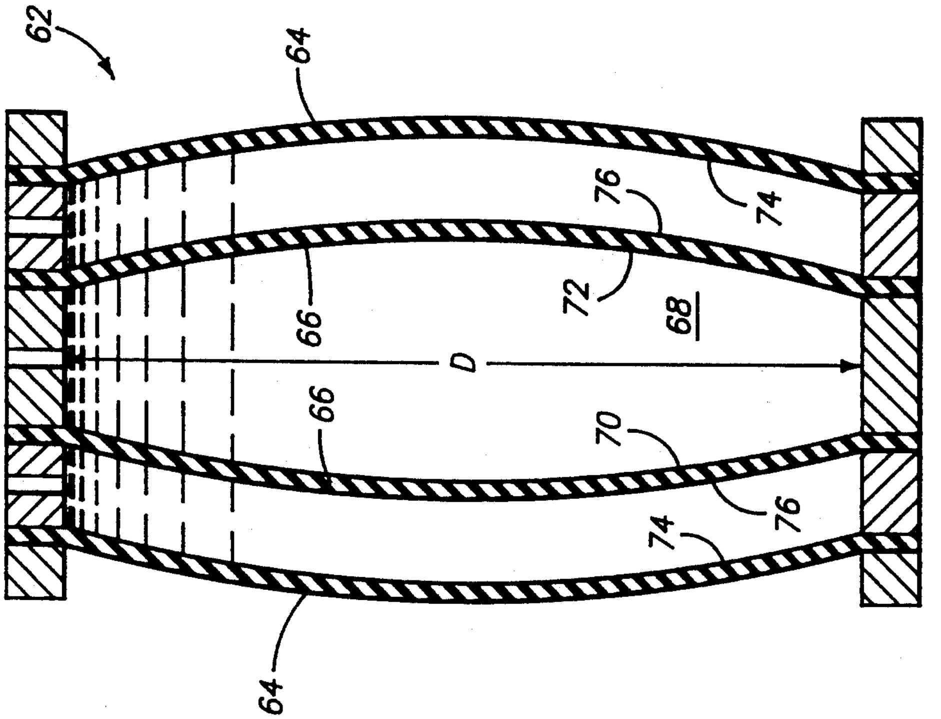
FIG. 3 PRIOR ART
FIG. 3 is a vertical cross sectional view of a prior art liquid ultrasonic lens also shown and described in the above mentioned patent.
Figure 2:
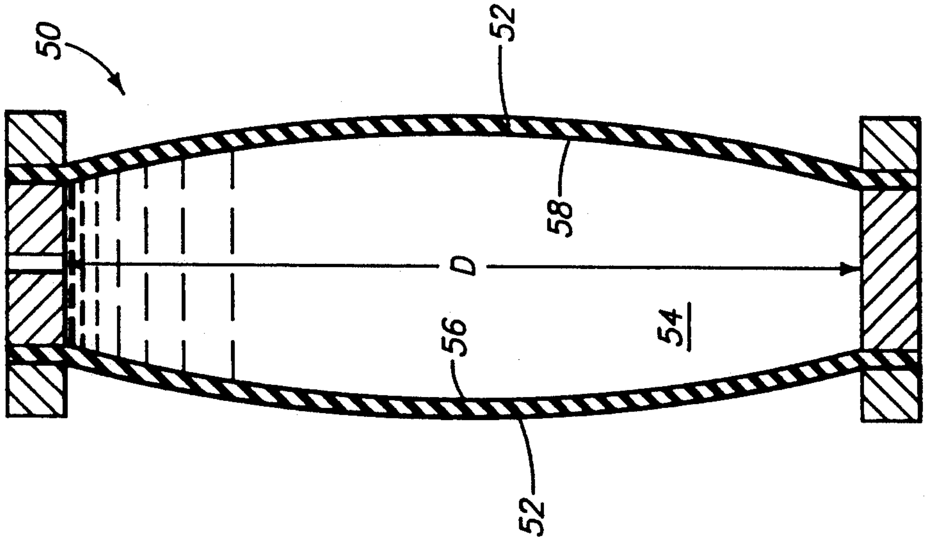
FIG. 2 PRIOR ART
FIG. 2 is a vertical cross sectional view of a prior art liquid ultrasonic lens shown and described in U.S. Pat. No. 3,802,533 to Byron B. Brenden.
Figure 4:
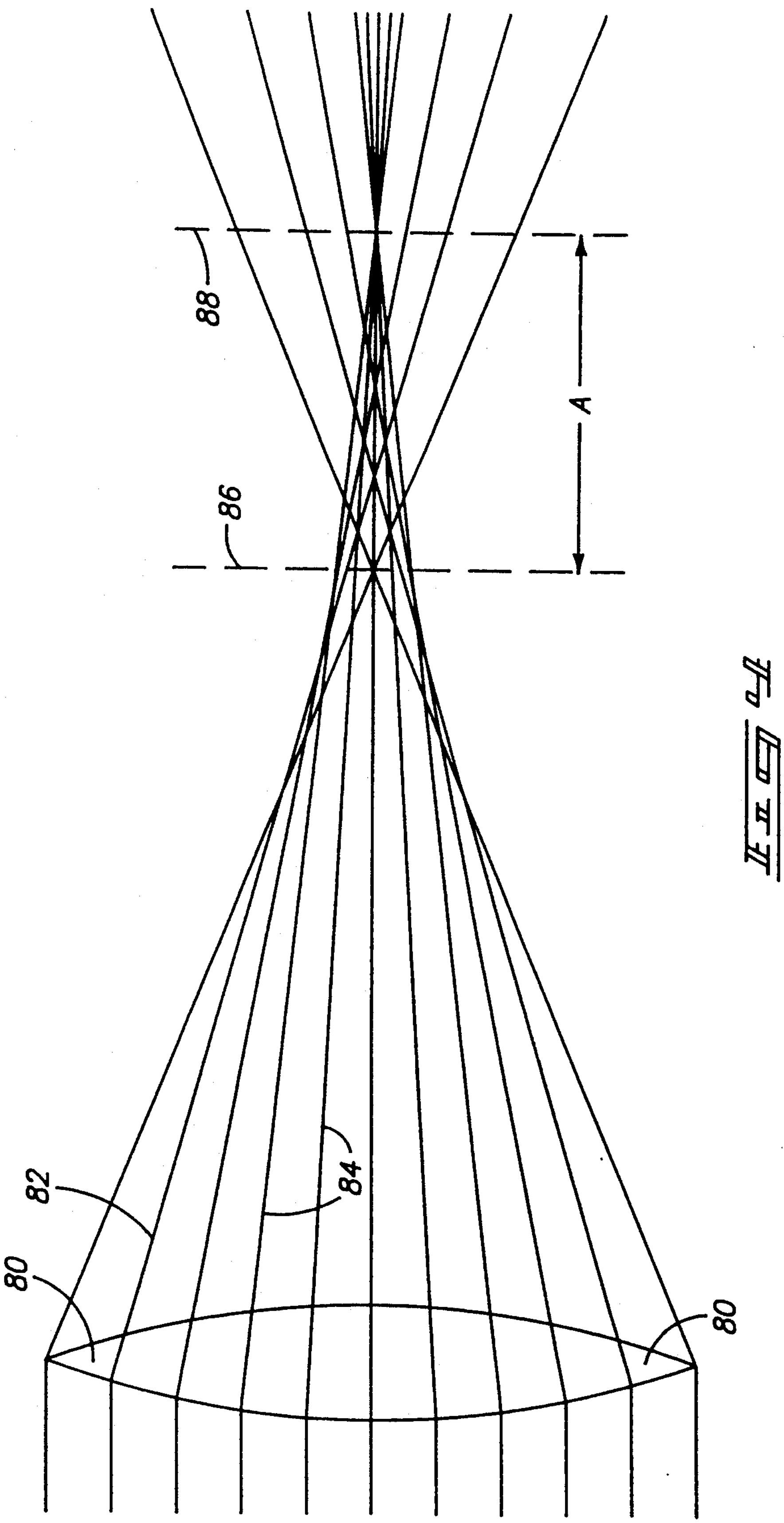
FIG. 4 PRIOR ART
FIG. 4 is schematic side view showing the path of focused rays from a typical prior art spherical double convex lens showing the effect of "spherical aberrations" in providing multiple focal lengths.
Figure 5:
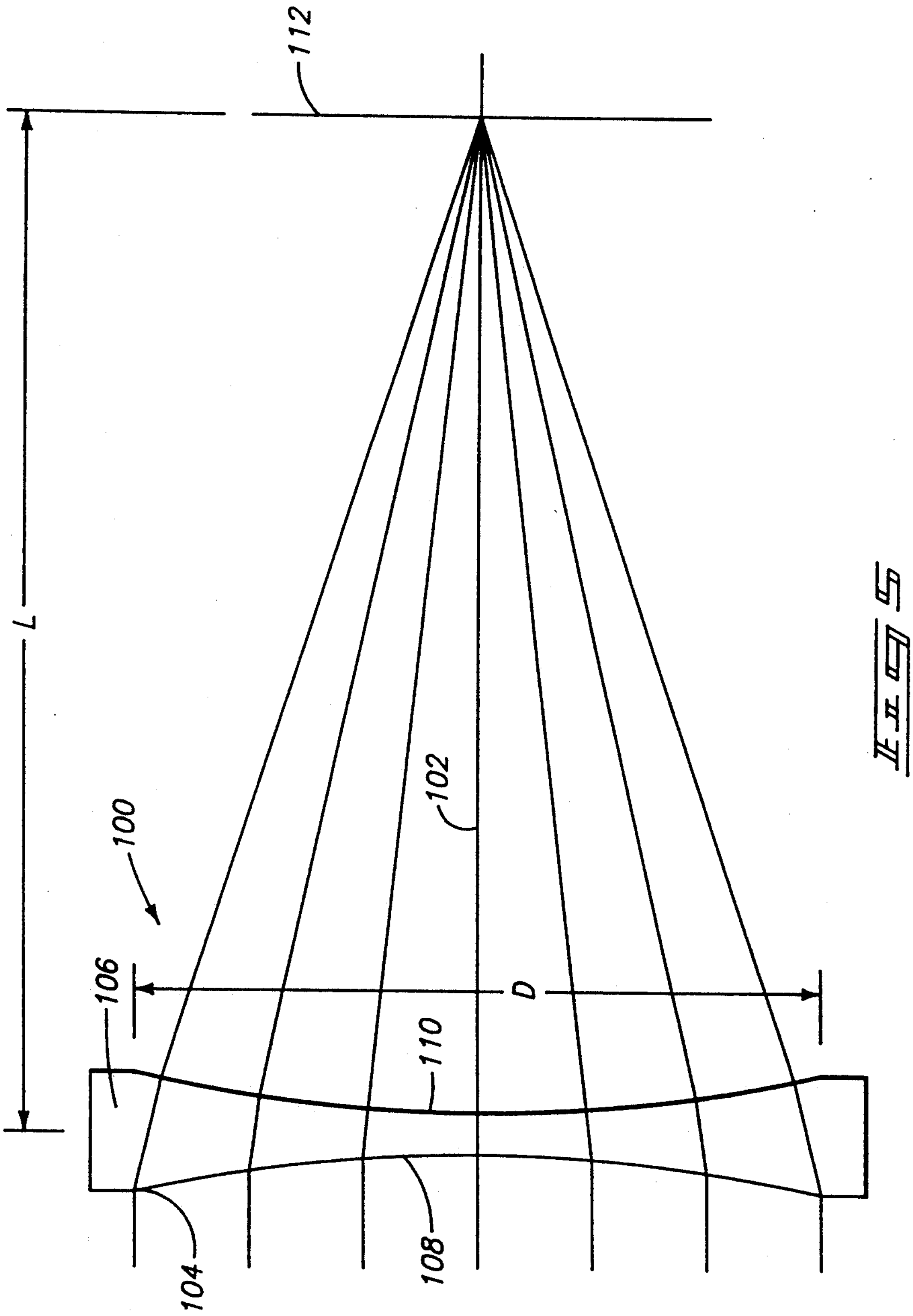
FIG. 5 is vertical cross section view of a preferred embodiment of this invention showing a large diameter solid ultrasonic imaging lens for use in a liquid ultrasonic transmitting medium to form focused ultrasonic holograms.

Referring now to FIG. 5, there is illustrated a preferred embodiment of the large diameter solid ultrasonic imaging lens which is generally designated with the numeral 100. The lens has an optical axis 108 with a diameter "D" that extends from the optical axis 102 to a periphery 104. At the periphery 104, the lens 100 has a mounting extension 106 to enable the lens 110 to be conveniently mounted in a support structure (not shown). The imaging lens 100 has concave surfaces 108 and 110 with a progressively increasing thickness from the optical axis 102 to the periphery 104. The lens 100 has an ultrasonic focal length "L" for converging the parallel rays to the focal plane 112.

Preferably, the solid lens 100 is formed of a homogenous synthetic plastic material that has a transmission velocity with respect to ultrasound (0.5 Megahertz to 10 Megahertz) of approximately twice that of water or less.

The density of the homogenous rigid plastic material preferably is less than water, and has preferred ultrasonic velocities of between 1.5 and 2.5 times that of water. The homogenous rigid plastic material is preferably selected from a group consisting of either a cross-linked polystyrene or polymethylpentene. The applicant has found that a cross-linked polystyrene manufactured by Polymer Corporation under the brand name "Rexolite" is quite useful. The polystyrene has an ultrasonic impedance of approximately 2.6. An alternative polymethylpentene manufactured by Mitsui Petrochemical Corporation under the brand name "TPX" has also been satisfactorily utilized. The ultrasonic impedance of TPX is approximately 1.8. The ultrasonic impedance of water is approximately 1.5.

The lens 100 preferably has a focal length-to-diameter ratio ($\phi$ number) of between one and two. Preferably, the focal length "L" is between 12 and 24 inches, and the diameter "D" is greater than 6 inches and preferably greater than 8 inches. The lens has a thin profile in which the mean radius of curvature of the concave surfaces 108 and 110 is at least five times greater than the diameter "D". Preferably, the mean radius of curvature should be greater than 8.5 times the diameter "D".

The lens 100 should have a lens diameter-to-thickness ratio of greater than four. Preferably the lens diameter-to-thickness ratio should be between four and twelve.

One or both of the surfaces 108 and 110 are formed with multiple radius of curvatures so that the incident ultrasound is focused at the focal plane 112 to provide a unique focusing of ultrasound over the entire face of the lens. The lens 100 is formed so that each small segment or increment of the lens surface has it own radius of curvature so that spherical aberrations are eliminated. Such a design shape can be readily achieved by using numerically controlled lathes or other computer controlled machining equipment. The lens material selected from machineable plastic such as TPX and Rexolite or other plastics that closely match the impedance of water (less than twice the impedance of water).

For example, an eight-inch diameter lens was manufactured with a constant radius of curvature of 10.713 inches for surface 108 and at multiple radius of curvatures for surface 110 as set forth in Table I. A separate radius of curvature was used for each 0.2 inch change in the diameter.

TABLE I

| LENS SURFACE 108 | | | | LENS SURFACE 110 | | | |
|---|---|---|---|---|---|---|---|
| Diameter Start | Diameter End | Z Movement | Radius | Diameter Start | Diameter End | Z Movement | Radius |
| 8.000 | 0.000 | −0.775 | 10.713 | 8.000 | 7.800 | −0.03790 | 11.14333 |
| | | | | 7.800 | 7.600 | −0.03690 | 11.12045 |
| | | | | 7.600 | 7.400 | −0.03590 | 11.09834 |
| | | | | 7.400 | 7.200 | −0.03490 | 11.07701 |
| | | | | 7.200 | 7.000 | −0.03390 | 11.05641 |
| | | | | 7.000 | 6.800 | −0.03290 | 11.03655 |
| | | | | 6.800 | 6.600 | −0.03191 | 11.01739 |
| | | | | 6.600 | 6.400 | −0.03092 | 10.99892 |
| | | | | 6.400 | 6.200 | −0.02994 | 10.98114 |
| | | | | 6.200 | 6.000 | −0.02896 | 10.96401 |
| | | | | 6.000 | 5.800 | −0.02797 | 10.94987 |
| | | | | 5.800 | 5.600 | −0.02699 | 10.93386 |
| | | | | 5.600 | 5.400 | −0.02602 | 10.91849 |
| | | | | 5.400 | 5.200 | −0.02505 | 10.90374 |
| | | | | 5.200 | 5.000 | −0.02408 | 10.88961 |
| | | | | 5.000 | 4.800 | −0.02312 | 10.87609 |
| | | | | 4.800 | 4.600 | −0.02215 | 10.86317 |
| | | | | 4.600 | 4.400 | −0.02119 | 10.85085 |
| | | | | 4.400 | 4.200 | −0.02023 | 10.83911 |
| | | | | 4.200 | 4.000 | −0.01928 | 10.82795 |
| | | | | 4.000 | 3.800 | −0.01832 | 10.81736 |
| | | | | 3.800 | 3.600 | 0.01737 | 10.80734 |
| | | | | 3.600 | 3.400 | −0.01642 | 10.79789 |
| | | | | 3.400 | 3.200 | −0.01547 | 10.78900 |
| | | | | 3.200 | 3.000 | −0.01452 | 10.78066 |
| | | | | 3.000 | 2.800 | −0.01358 | 10.77287 |
| | | | | 2.800 | 2.600 | −0.01263 | 10.76564 |
| | | | | 2.600 | 2.400 | −0.01169 | 10.75895 |
| | | | | 2.400 | 2.200 | −0.01075 | 10.75280 |
| | | | | 2.200 | 2.000 | −0.00981 | 10.74719 |
| | | | | 2.000 | 1.800 | −0.00887 | 10.74213 |
| | | | | 1.800 | 1.600 | −0.00794 | 10.73760 |
| | | | | 1.600 | 1.400 | −0.00700 | 10.73361 |
| | | | | 1.400 | 1.200 | −0.00606 | 10.73015 |
| | | | | 1.200 | 1.000 | −0.00513 | 10.72723 |
| | | | | 1.000 | 0.800 | −0.00419 | 10.72484 |
| | | | | 0.800 | 0.600 | −0.00326 | 10.72298 |
| | | | | 0.600 | 0.400 | −0.00233 | 10.72165 |
| | | | | 0.400 | 0.200 | −0.00139 | 10.70285 |
| | | | | 0.200 | −0.000 | −0.0046 | 10.71262 |
| | | | | Total Z = | | −0.75763 | |

The lens design and the manufacture procedure allows accurate focusing and projection of large size images onto the detector surface as used in a variety of ultrasonic image methods, but more precisely in that of ultrasonic holography particularly used for medical purposes.

Figure 6:
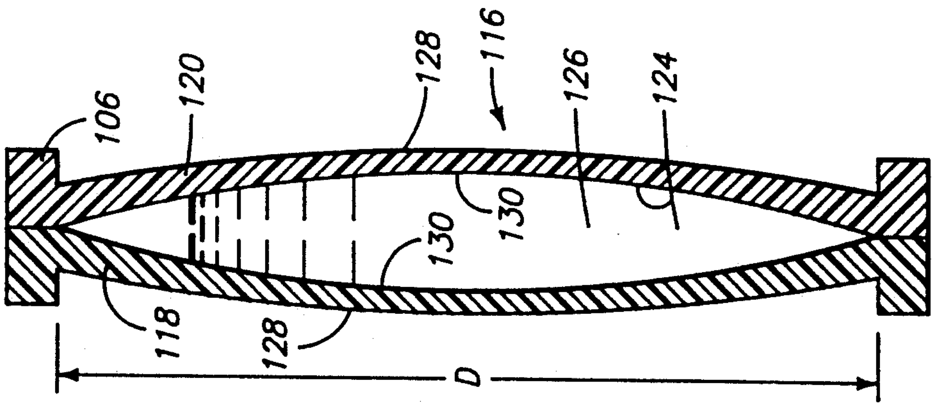
FIG. 6 is a vertical cross sectional view of an alternate embodiment showing a large diameter combination solid and liquid ultrasonic imaging lens.

An alternate solid ultrasonic lens 116 is illustrated in FIG. 6 and includes symmetrical solid rigid lens elements 118 and 120, each of which would be classified as a concavo-convex lens element. The two lens elements 118 and 120 provide a liquid cavity 124 that defines a liquid lens 126 containing a liquid lens material. The liquid lens 126 can be classified as a double convex lens. The liquid material is preferably has the density greater than water, such as trichloro-trifluoroethane having density of approximately 2. The density of the fluid is greater than that of water, and has a transmitting ultrasound velocity of approximately one-half that of water.

The solid rigid lens elements 118 and 120 each have a convex exterior surface 128 and a concave interior surface 130 forming the concavo-convex lens elements. The convex exterior surface 128 and the concave interior surface 130 have different radius of curvatures so that the thickness of each of the elements 118 and 120 progressively increases in thickness from the axis 102 to the periphery 104. The conveying liquid lens 126 has double convex liquid surfaces. The solid rigid lens elements 118 and 120 may be cast or machined as precision elements that are compatible with the liquid lens 126 so that there is an equal amplitude of ultrasound over the entire lens 116 that allows the efficiency of lens design using fluids in conjunction with solid lens elements to provide for stability and constant means radius of curvatures of the surfaces to obtain consistent quality imaging.

Figure 7:
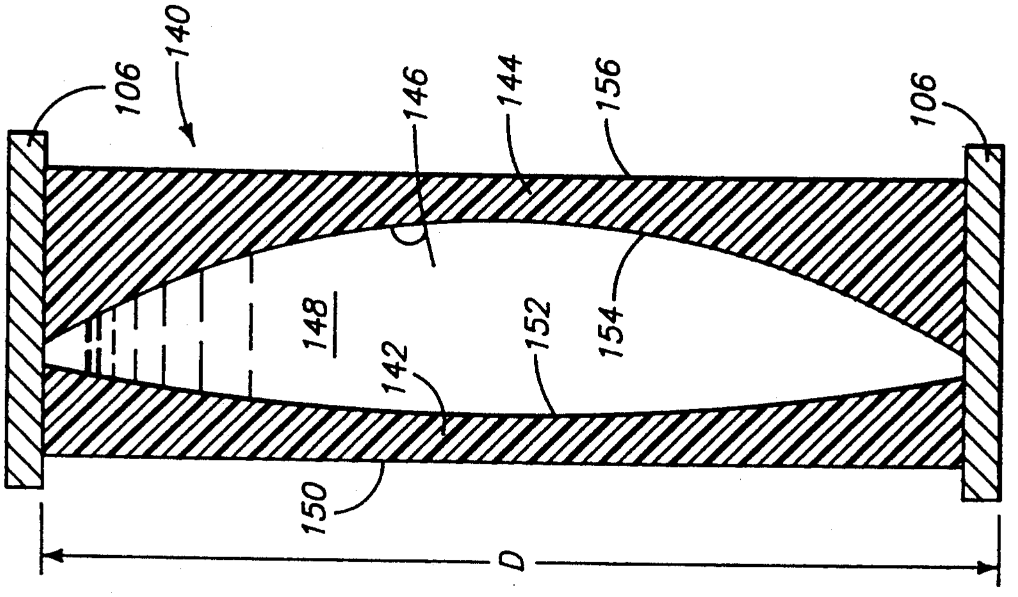
FIG. 7 is a vertical cross sectional view of a second alternate embodiment showing a large diameter combination solid and liquid ultrasonic imaging lens.

An alternate combination solid liquid ultrasonic lens is illustrated in FIG. 7 and is designated with the numeral 140. The lens 140 has asymmetrical solid lens elements 142 and 144. The lens elements 142 and 144 provide a cavity 146 for providing a liquid lens 148. The lens element 142 includes a planar exterior lens surface 150 with a concave interior solid lens surface 152 having a constant radius of curvature. The lens element 144 has an interior lens surface 154 that is formed utilizing the formula previously set forth to obtain a computer generated profile in which the surface has a mean radius of curvature at least four times greater than the diameter. The lens element 144 has an exterior lens surface 156 that is planar. The liquid lens 148 has liquid concave surfaces that are converging in nature to provide the benefit of a combination solid and a liquid lens.

Figure 9:
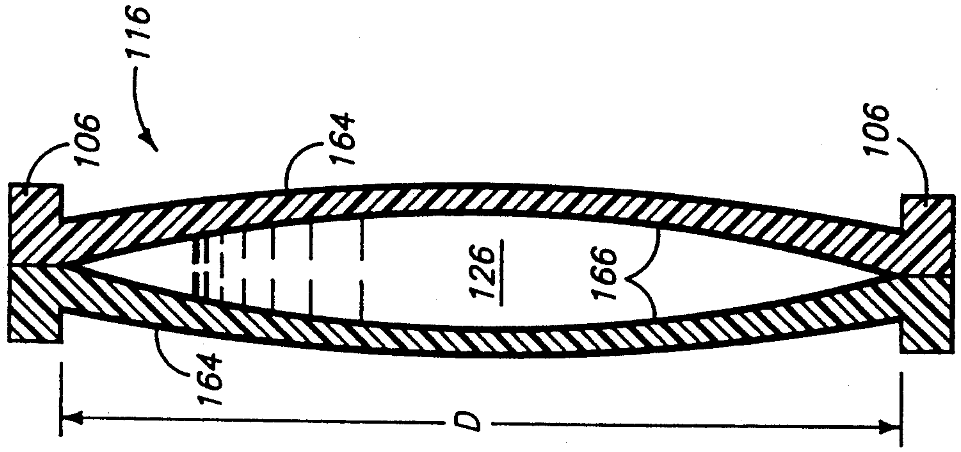
FIG. 9 is a vertical cross section view of a fourth alternate embodiment similar to FIG. 6 except showing reflection reduction layers.
Figure 8:
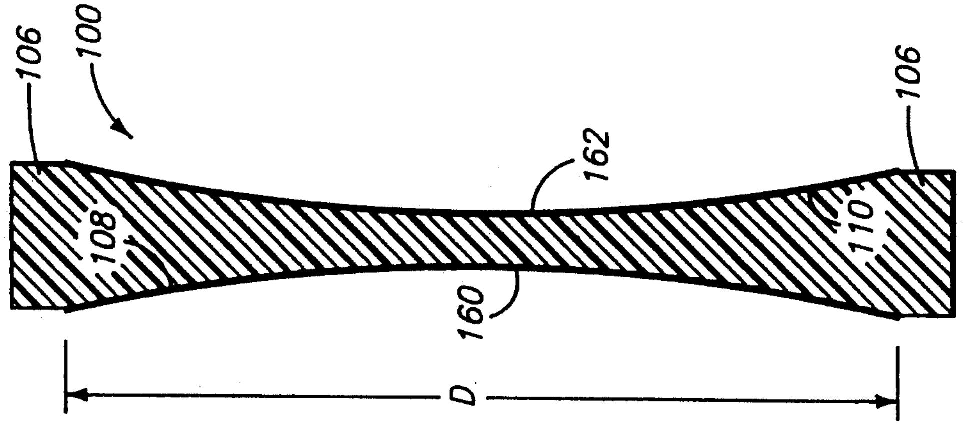
FIG. 8 is a vertical cross sectional view of a third alternate embodiment similar to the embodiment illustrated in FIG. 5 except showing reflection reduction layers.

In further alternate embodiments, the lenses illustrated in FIGS. 5 and 6 are again illustrated in FIGS. 8 and 9 except that the lens surfaces have reflection reduction layers for reducing energy loss due to reflection from the solid surfaces of the lenses. Prior art solid state lenses had reflections of as much as 25% of the incident energy, whereas the present lens as illustrated in FIGS.

5-7 has a loss of as little as 2% of the energy of the incident wave. With the addition of the reflection reduction layers, such loss is even reduced further.

More specifically, the lens 100 illustrated in FIG. 8 has a reflection reduction layer 160 formed on the concave surface 108, and a similar reflection reduction layer 162 formed on the concave surface 110 to reduce incident reflection from the surfaces. Preferably, the thickness of the layers 160 and 162 are such as to provide a matching impedance layer to minimize reflection from these surfaces over the ultrasound frequency range of interest, 0.5-10 MHz. A general formula for the impedance matching layer thickness:

$$Z_2 = \sqrt{Z_1 Z_3}$$

where $Z_2$ is the ultrasonic impedance of the matching layer and $Z_1$ and $Z_3$ are the ultrasonic impedances of the materials on either side of the matching layer. Additionally, the reflection reduction layers 160 and 162 should be formed of a material that has an ultrasonic impedance between that of the fluid transmitting medium, such as water, and the impedance of the solid rigid plastic lens material. For example, the ultrasound impedance of TPX is approximately 1.8, and the impedance of Rexolite is approximately 2.6. The ultrasound impedance of water is 1.5. Consequently, the proper impedance of the reflection reduction layers 160 and 162 should be between 1.5 and 2.6, inclusive.

Applicant has found that there are several polymides that are particularly attractive that have the proper impedance and can be deposited or sprayed onto the solid surfaces as reflection reduction layers. Furthermore, the layers 160, 162 may have an additional advantage of reducing the corrosiveness of the liquid lens material with respect to the plastic solid rigid material to expand the choices of liquid lens material.

The lens 116 illustrated in FIG. 9 includes outer reflection reduction layers 164 and inner reflection reduction layers 166. The inner reflection reduction layers 166 interface with the liquid lens surfaces of the liquid lens 126 to provide not only a protective coating of the solid rigid plastic material, but to serve to reduce reflections from the solid surfaces.

The lenses of this invention, overcome many of the previously identified problems with solid lens material for large diameter ultrasonic imaging systems, particularly those utilized for ultrasonic holographic imaging. It should be noted that all of the lenses of the present invention are converging lenses that focus a large object field with accuracy at a rather precise focal length, minimizing the distortions and aberrations of the previous lenses.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A large diameter solid ultrasonic imaging lens, comprising:

a) a thin lens body comprising a solid rigid material extending radially outward from a optical lens axis to a periphery;

b) said thin lens having a large diameter-to-thickness ratio;

c) said solid rigid material having a ultrasound velocity greater than the ultrasound velocity of water;

d) said thin lens body having two exterior solid rigid surfaces in which at least one exterior surface is an ultrasonically converging, contoured curved surface for focusing ultrasound at a prescribed focal length along the optical lens axis;

e) wherein the one exterior surface has multiple radius of curvatures for focusing the ultrasound at the prescribed focal length along the optical lens axis.

2. The large diameter solid ultrasonic imaging lens as defined in claim 1 wherein the lens has a focal length to diameter ratio of greater than one.

3. The large diameter solid ultrasonic imaging lens as defined in claim 1 wherein the lens as a focal length to diameter ratio of between one and two.

4. The large diameter solid ultrasonic imaging lens as defined in claim 1 wherein the lens has a focal length of between 12 and 24 inches.

5. The large diameter solid ultrasonic imaging lens as defined in claim 1 wherein the lens has a diameter greater than 6 inches.

6. The large diameter solid ultrasonic imaging lens as defined in claim 1 wherein the lens has a diameter greater than 8 inches.

7. The large diameter solid ultrasonic imaging lens as defined in claim 1 wherein the solid rigid material has an ultrasonic velocity that is less than three times greater than the ultrasonic velocity of water.

8. The large diameter solid ultrasonic imaging lens as defined in claim 1 wherein the solid rigid material has an ultrasonic velocity that is less than two times greater than the ultrasonic velocity in water.

9. The large diameter ultrasonic imaging lens as defined in claim 1 wherein the solid rigid material is a synthetic plastic material having a density less than water.

10. The large diameter solid ultrasonic imaging lens as defined in claim 9 wherein the solid rigid material is selected from a group comprised of polystyrene and polymethylpentene.

11. The large diameter solid ultrasonic imaging lens as defined in claim 9 therein the synthetic plastic material has a ultrasound velocity of less than three times greater than the ultrasound velocity of water.

12. The large diameter solid ultrasonic imaging lens as defined in claim 1 wherein the one lens exterior surface is a concave shaped curved surface.

13. The large diameter solid ultrasonic imaging lens as defined in claim 1 wherein each of the two lens exterior solid rigid surface have concave shaped surfaces.

14. The large diameter solid ultrasonic imaging lens as defined in claim 1 therein the lens has a diameter-to-thickness ratio of greater than four.

15. The large diameter solid ultrasonic imaging lens as defined in claim 1 therein the lens has a diameter-to-thickness ratio of between four and twelve.

16. The large diameter solid ultrasonic imaging lens as defined in claim 1 wherein the solid rigid material is homogenous between the two exterior surface.

17. The large diameter solid ultrasonic imaging lens as defined in claim 16 wherein the two exterior surfaces have concave-shaped optically converging surfaces.

18. The large diameter solid ultrasonic imaging lens as defined in claim 16 wherein the one exterior surface is contoured to focus the transmitted ultrasound sound waves at the focal length to reduce lens aberrations.

19. The large diameter solid ultrasonic imaging lens as defined in claim 18 wherein both of the exterior lens surfaces are concave shaped and are contoured to focus the transmitted ultrasound at the focal length to reduce spherical aberrations.

20. The large diameter solid ultrasonic imaging lens as defined in claim 1 wherein the thin lens body comprises (1) two solid rigid lens elements extending radially outward from the center lens axis to the periphery having interior surfaces forming a lens cavity therebetween, and (2) a lens liquid filling the lens cavity.

21. The large diameter solid ultrasonic imaging lens as defined in claim 20 wherein the lens liquid has a density greater than water.

22. The large diameter solid ultrasonic imaging lens as defined in claim 20 wherein at least one of the solid rigid lens elements has a concave-shaped interior surface.

23. The large diameter solid ultrasonic imaging lens as defined in claim 20 wherein the two solid rigid lens elements have concave-shaped interior surfaces forming a double convex liquid lens therebetween.

24. A large diameter solid ultrasonic imaging lens, comprising:

a) a thin lens body comprising a solid rigid material extending radially outward from a optical lens axis to a periphery;

b) said thin lens having a large diameter-to-thickness ratio;

c) said solid rigid material having a ultrasound velocity greater than the ultrasound velocity of water;

d) said thin lens body having two exterior solid rigid surfaces in which at least one exterior surface is an ultrasonically converging, contoured curved surface for focusing ultrasound at a prescribed focal length along the optical lens axis;

e) wherein the thin lens body comprises (1) two solid rigid lens elements extending radially outward from the center lens axis to the periphery having interior surfaces forming a lens cavity therebetween, and (2) a lens liquid filling the lens cavity; and f) wherein at least one of the solid lens elements has a thickness that is less at the center axis than at the periphery.

25. The large diameter solid ultrasonic imaging lens as defined in claim 24 wherein the solid element thickness progressively increases from the center axis to the periphery.

26. The large diameter solid ultrasonic imaging lens as defined in claim 20 wherein the lens further comprises ultrasonic reflection reduction layers on the exterior solid rigid surfaces for reducing reflection of the ultrasound from the exterior surfaces.

27. The large diameter solid ultrasonic imaging lens as defined in claim 26 wherein reflection reduction layers have a thickness related to one-quarter the wavelength of the ultrasound.

28. The large diameter solid ultrasonic imaging lens as defined in claim 1 wherein the one exterior surface is subdivided into small segments, each segment having its separate radius of curvature that is focused at the prescribed focal length along the optical lens axis to minimized spherical aberrations.

29. The large diameter solid ultrasonic imaging lens as defined in claim 28 wherein the separate radius of curvature of the segments progressively changes in relation to the distance of the segment from the optical lens axis.

30. The large diameter solid ultrasonic imaging lens as defined in claim 29 wherein the one exterior surface is a concave shape and the radius of curvatures of the segments progressively increase as the distance of the segments from the optical lens axis increases.

* * * * *